3,600,250
STRETCHING AND LAMINATING THERMO-
PLASTIC ELASTOMERS
Anthony C. Evans, Redondo Beach, Calif., assignor to
Shell Oil Company, New York, N.Y.
Filed Sept. 12, 1968, Ser. No. 759,365
Int. Cl. B32b 31/00
U.S. Cl. 156—229
2 Claims

ABSTRACT OF THE DISCLOSURE

A process is provided for the production of thin films of thermoplastic elastomers comprising hot drawing and cold elastic elongation of an extruded film followed by hot lamination with a substrate. An apparatus is provided for carrying out this process which inherently involves high speed lamination and, if desired, very thin films due to the high cold stretchability possible with thermoplastic elastomers.

---

Figure 1:
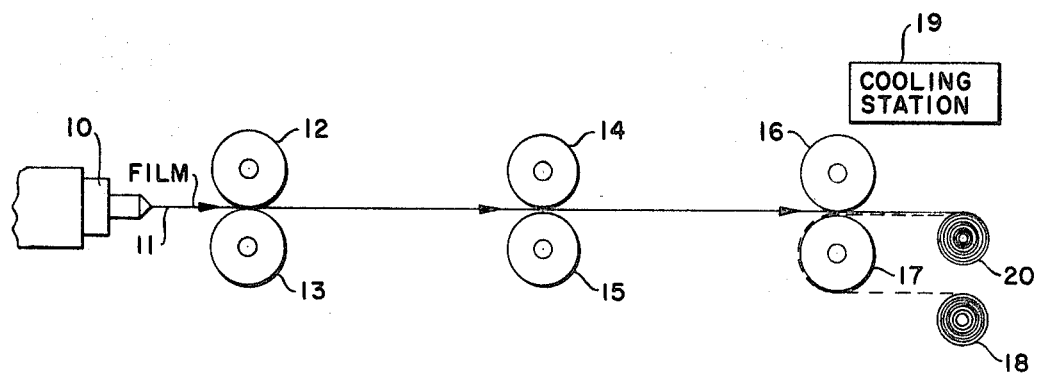

This invention relates to the stretching of thermoplastic elastomers to extremely thing gauges and the lamination of this stretched film to sheet material of stable dimensions. The invention also relates to an arrangement of apparatus for accomplishing this under high rates of throughput.

Many processes have been proposed for the formation of polymeric films and laminates therefrom. In most cases, these relate to rubbers which require vulcanization steps or to thermal elastic films such as rubber hydrochloride or more commonly to thermoplastic materials such as polyethylene and the like. In most cases it is possible, as in the case of polyethylene or other polyolefins, to hot draw the polymer material due to the high draw down properties of the polymer. The cold draw of thermoplastics such as polyethylene, is relatively limited and the ability to cold draw cannot therefore be capitalized upon to increase the coating line speed in making laminates or coated substrates therefrom. Their elastic stretchability also is negligible. However, it also is not advisable to raise the temperature and thereafter attempt to stretch the film of a thermoplastic elastomer since rupture will shortly occur.

It is an object of the present invention to provide a process for the formation of extremely thin films of thermoplastic elastomers. It is also an object of the present invention to provide an assembly of apparatus for accomplishing this process. Other objects will become apparent during the following detailed description of the invention.

Now in accordance with the present invention, a process for the production and lamination of films comprising thermoplastic elastomers is provided comprising extruding a molten film-forming composition of the thermoplastic elastomer in the shape of a film; drawing the film through chilling rolls at a rate $x$, which is faster than the film extrusion rate and which is up to the maximum drawdown rate above which web rupture occurs; passing the cold film through an additional set of chilling rolls at a rate $xn$, wherein $n$ is an integer of at least 4, whereby the film is cold stretched at a temperature below its melt temperature and which allows maximum elastic elongation without rupture; and laminating the drawn and stretched film to a substrate by passage in contact with a heated roll at a temperature and pressure sufficient to cause adhesion of the film to the substrate.

One striking aspect of the present invention is due to the unique and inherent properties of the block copolymers employed: After the cold elongation, the sealing or fusion (either partial or complete) to the paper or other substrate causes stress relaxation of the block copolymer film and reorientation of the molecules occurs, resulting in the formation of new domains. The latter are responsible for the excellent physical properties of the block copolymers, and constitute a thermally reversible substitute for the chemical cross-linking which is irreversibly formed during sulfur vulcanization.

Due to the reorientation, the block copolymer film again becomes stress-free and has all the properties of the original film. That is, in particular, after lamination to the paper, since all the stresses have been relieved and a new domain structure formed, the laminated film is capable of another high degree of extension, e.g., of 400–1,000% or more. The coated paper thus has an extremely high degree of puncture resistance.

An apparatus suitable for carrying out this process comprises in combination means for extruding a molten thermoplastic elastomer film, means for hot drawing at an increased rate of $x$ feet per minute said film through a predetermined path in an essentially adiabatic condition so that the drawn film remains dimensionally stable; means for cooling the drawn film; means for advancing the drawn film in unheated condition at a rate $xn$ feet per minute where $x$ and $n$ are defined as above so that the drawn film is stretched to essentially its elastic limit but remains dimensionally stable; means for moving a substrate web through a heated rotating mechanism for heating at least one surface of the web to a temperature approximating the heat sealing temperature of the drawn-stretched film and means for pressing the film against the heated web on the heated rotating mechanism whereby a laminate of the drawn-stretched elastomer and web is formed.

The thermoplastic elastomers especially contemplated in the process utilizing the above-described apparatus are those which possess the properties generally recognized as elastomeric but which properties are normally associated with vulcanized elastomers. However, the thermoplastic elastomers are of such a character that vulcanization is not necessary and therefore the unvulcanized polymers may be processed in thermoplastic processing equipment as long as certain physical limitations such as those considered here are taken into account. As referred to above, the thermoplastic elastomers have capability of being drawn down, and in addition, they are highly extensible and may be stretched to an extent in excess of 1,000% as opposed to the relatively limited stretchability of thermoplastic materials in general. The preferred class of thermoplastic elastomers comprise block copolymers having the general structure $$A(B\text{---}A)_n$$

wherein $n$ is an integer between 1 and 5. Thus the block copolymers may be regarded as having at least three essential polymer blocks and may have a linear or non-linear configuration and may be made by sequential processes or by coupling processes. Certain special configuration referred to as radial polymers or graft polymers or branched polymers are also contemplated which fall within the general configuration given above, any coupling radicals being ignored in this general formula. Typical block copolymers comprise those in which the polymer blocks A are thermoplastic polymer blocks such as polystyrene blocks, alpha-olefin blocks or hydrogenated polymer blocks such as hydrogenated polystyrene. The elastomeric blocks B are normally conjugated diene polymer blocks, hydrogenated derivatives thereof or alpha-olefin copolymer blocks. Typical species include the following: polystyrene - polyisoprene - polystyrene, polystyrene-[styrene-butadiene random copolymer]-polystyrene, polystyrene - polybutadiene - polystyrene, polypropylene- (EPR)-polypropylene, polyethylene-(EPR)-polyethylene, polyvinylcyclohexane-(hydrogenated polyisoprene)-polyvinylcyclohexane.

Other suitable thermoplastic elastomers which may be utilized for the present purpose include vinyl acetate-ethylene copolymers, methyl methacrylate-ethylene copolymers and certain polyurethanes. The film forming composition may contain other non-polymeric materials such as extending oils, plasticizers or pigments and may be modified as well with thermoplastic polymers such as polystyrene, polyolefins and the like.

In accordance with the process of this invention, it has been found necessary to process the thermoplastic elastomer only within the limitations imposed by the general physical properties which they possess. Elastic elongation, particularly in the case of thermoplastic elastomers of the monovinyl arene-conjugated diene-monovinyl arene block copolymer structure is usually in the order of between about 200 and about 1500% of extension at ambient temperatures, which are in the order of 15–40° C. The extensibility of the cold block copolymer film is far greater than that normally possessed by the usual thermoplastic materials or by thermal elastic rubbers. Consequently, it is possible to stretch the film at least 4 times its length and usually at least about 10 times without rupture. The stretching operation also must be done at ambient temperatures in the same general temperature range, namely, 15–40° C. since the tensil strength of the thermoplastic elastomer has been found to decrease rapidly as the temperature rises. This is in direct contrast to the experience with thermal elastic rubbers where it is possible to stretch thermal elastic rubbers such as rubber hydrochloride at elevated temperatures. In the present instance, however, it is necessary to stretch the thermoplastic elastomer at ambient temperatures and thereafter subject the drawn and stretched film to a higher temperature still short of its softening point at the time of contact with the substrate with which it is to be united. The ultimate achievement of this operation is, in fact, a high speed production of an extremely thin film of thermoplastic elastomer, which is preferably used as a coating on a substrate such as paper or thermoplastic film.

The achievement then is a product of an economically competitive product having an extremely high bursting strength useful essentially for wrapping of foods and the like which will not contaminate since the thermoplastic elastomer does not contain vulcanizing agents or their reaction residues. It is therefore possible to utilize these materials for the wrapping of meats and other foodstuffs to produce a wrapped article of commerce which will bear relatively rough handling and transportation.

The apparatus which may be employed in the subject process is illustrated in several preferred forms in the figure which are described as follows:

FIG. 1 shows an elementary assembly comprising an extruder 10 from which a film 11 is extruded and passed between idler roll 12 and driven roll 13 both of which are internally cooled and through which the film proceeds at a rate of $x$ feet per minute. Normally, this rate will be in the order of between about 100 and about 500 feet per minute, especially when the preferred class of block copolymer thermoplastic elastomers is being processed. The action of this pair of rolls is such that the speed through and beyond the rolls is in excess of the speed of extrusion of film 11 from the extruder 10. The resulting film then proceeds to another pair of rolls 14 and 15. These are also respectively an idler roll and a driven roll and also are both operated with internal cooling. These rolls are being rotated at a speed of $nx$ feet per minute. Thus the film passes through the second pair of rolls, namely, 14 and 15 and in so doing is stretched to its preferably near maximum extent without rupture and at a temperature which is substantially below its softening point. In the case of the thermoplastic elastomers, as stated hereinbefore, the cold stretching may be to the extent of at least 400% and preferably about about 1,000%, thus resulting in an extremely thin film which may be as little as 1 mil or less in thickness. The drawn and stretched cold film is then passed to a pair of heated rolls 16 and 17, the first being an idler roll and the second being a driven roll. The speed here is essentially the same as that through rolls 14 and 15 and the temperature achieved by the film between rolls 16 and 17 is sufficient to put it in a tacky condition sufficient to adhere to a substrate from roll 18 which is lead around the drive hot roll and due to the temperature and pressure experienced in this arrangement will adhere firmly to the heated drawn and stretched thermoplastic elastomer film. The laminate so formed is then passed to a cooling station 19 and thereafter to a rollup or windup roll 20.

Figure 2:
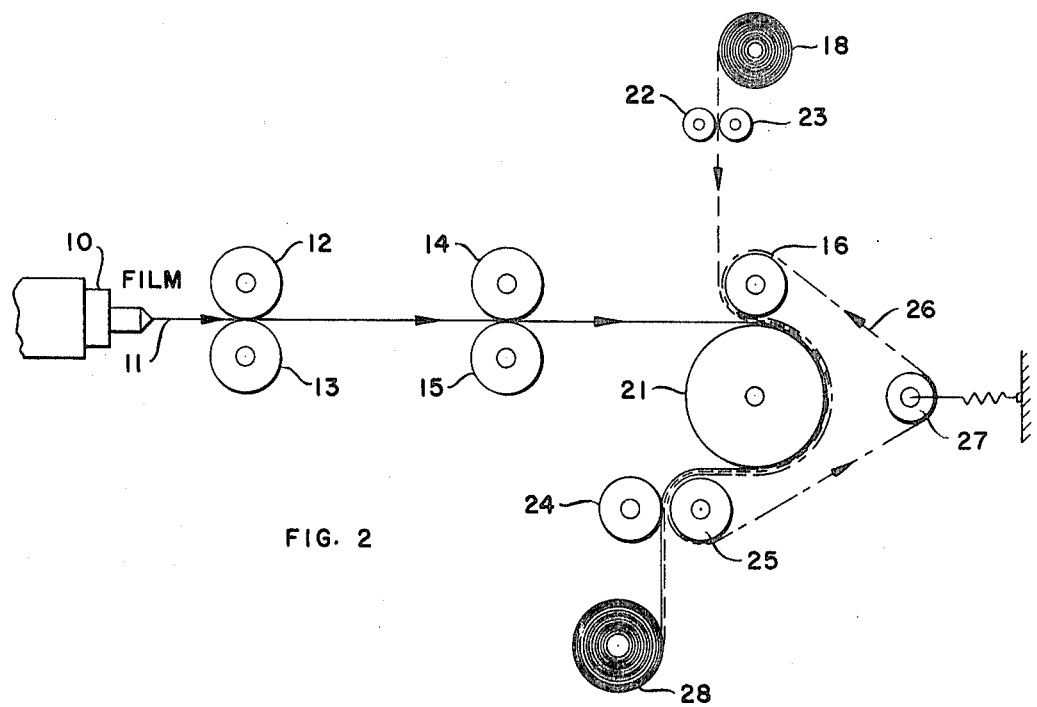

FIG. 2 illustrates a somewhat more sophisticated arrangement of apparatus essentially designed to capitalize upon the physical properties of the polymer and to resulting in a non-curling laminated product. It involves the same extruder 10, the same film of thermoplastic elastomer 11, the two pairs of cold rolls 12 and 13 as well as 14 and 15 through which the thermoplastic elastomer film is first drawn and thereafter cold stretched under the speed and temperature conditions outlined above. The film then is sent to a pair of hot rolls, one of which is the same as hot idler roll 16 and the second of which is a hot driven roll 21 of substantially greater diameter. The paper from roll 18 is passed through a pair of hot rolls 22 and 23 to heat the paper or other substrate to a temperature approximately that of the drawn and stretched film as it approaches or contacts rolls 16 and 21. The heated paper then is drawn between rolls 16 and 21 in contact with the drawn and stretched heated thermoplastic elastomer film in such a way that it is on the outside of the laminate proceeding around the exterior of drum 21, the thermoplastic elastomer film being between the substrate and the drum surface. The laminate so formed is then sent to a pair of cold rolls 24 and 25 and thereafter to windup roll 28. A supporting belt 26 may optionally be positioned as shown which aids in pressing the paper against the elastic film and later against the drum 21. This supporting belt is tensioned by passage over a cold idler roll 27. The paper is handled under constant tension equal to or greater than the tension in the film. When the two layers of film and substrate wrap around the large hot roll 21, the film being on the inside, the curvature of the latter is slightly less than that of the paper and with the paper being under an equal or greater tension a partial relaxation of the film will occur with the stresses being transferred to the substrate. The tension of the paper forces the film against the roll and frictional forces, mainly between the film and the paper but also between the film and the roll, hold the film in place and supplement the decreasing tensile strength as the film is warmed. The stresses in the film are thereby completely transferred to the paper, the roll and the supporting belt.

I claim as my invention:

1. The process for the formation of a laminate comprising:
    (a) continuously extruding a molten film-forming composition comprising a thermoplastic elastomer in the shape of a film;
    (b) continuously and simultaneously drawing the film through chilling rolls at a rate $x$ faster than the film extrusion rate at a temperature below the melt temperature of the elastomer and at a rate of extension low enough to prevent fracture;
    (c) passing the drawn film through chilling rolls at a rate $xn$ wherein $n$ is an integer of at least 4, whereby the drawn film is cold stretched at a temperature below its melt temperature; and
    (d) laminating the drawn and stretched film to a substrate by passage in contact with a heated roll at a temperature and pressure sufficient to cause adherence of the film to the substrate.

2. A process according to claim 1 for the formation of a paper coated with a block copolymer thermoplastic elastomer comprising:
  (a) extruding a molten composition in the form of a film, said composition comprising a block copolymer having the general configuration $A\text{-}(B\text{-}A)_n$ wherein $n$ is an integer from 1 to 5, A is a polystyrene block and B is a polybutadiene block;
  (b) drawing the film through chilling rolls at a rate substantially greater than the extrusion rate while maintaining the temperature between about 15 and 40° C. and at a rate low enough to prevent fracture;
  (c) stretching the film through a second set of chilling rolls at a rate of at least 4 times greater than the rate in stage (b) and at a temperature between 15 and 40° C.;
  (d) heating the drawn and stretched film to a temperature at 120–155° C.; and
  (e) at said temperature laminating a paper web thereto.

References Cited

UNITED STATES PATENTS

| | | | |
|---|---|---|---|
| 3,265,552 | 8/1966 | Berggren et al. | 156—244 |
| 3,342,657 | 9/1967 | Dyer | 156—229X |
| 3,394,045 | 7/1968 | Gould | 156—229X |
| 3,397,101 | 8/1968 | Rausing | 156—229 |
| 3,475,248 | 10/1969 | Brasure | 156—229 |
| 3,502,528 | 3/1970 | Yushimura | 156—229X |
| 3,392,076 | 7/1968 | Vander Pals | 156—244 |
| 3,397,101 | 8/1968 | Rausing | 156—244X |
| 3,420,679 | 1/1969 | Gifford et al. | 156—244X |
| 3,475,248 | 10/1969 | Brasure | 156—244X |

BENJAMIN R. PADGETT, Primary Examiner

S. J. LECHERT, Jr., Assistant Examiner

U.S. Cl. X.R.

156—244, 306, 322, 324